United States Patent
Wolf (10) Patent No.: US 7,599,395 B1
(45) Date of Patent: Oct. 6, 2009

(54) APPARATUS, METHOD AND A COMPUTER READABLE MEDIUM FOR GENERATING MEDIA PACKETS

(75) Inventor: Amir Wolf, Hod Hasharon (IL)

(73) Assignee: Emblaze V con, Raánana (IL)

( * ) Notice: Subject to any disclaimer, the term of this patent is extended or adjusted under 35 U.S.C. 154(b) by 1349 days.

(21) Appl. No.: 10/243,120

(22) Filed: Sep. 13, 2002

(51) Int. Cl.
*H04J 3/16* (2006.01)
*G06F 15/16* (2006.01)

(52) U.S. Cl. .................. 370/470; 709/227

(58) Field of Classification Search .......... 370/470, 370/473, 477, 476, 472, 468, 538, 232, 233, 370/230, 235, 395.2, 352, 474, 485, 486, 370/487; 348/423, 462, 13, 399; 709/231, 709/200, 236, 246, 247, 239; 375/240.12; 725/143, 145
See application file for complete search history.

(56) References Cited

U.S. PATENT DOCUMENTS

| | | | | |
|---|---|---|---|---|
| 5,541,919 A | * | 7/1996 | Yong et al. | 370/416 |
| 5,802,068 A | * | 9/1998 | Kudo | 370/538 |
| 6,389,473 B1 | * | 5/2002 | Carmel et al. | 709/231 |
| 6,769,030 B1 | * | 7/2004 | Bournas | 709/233 |
| 7,058,721 B1 | * | 6/2006 | Ellison et al. | 709/231 |
| 7,299,290 B2 | * | 11/2007 | Karpoff | 709/231 |

* cited by examiner

*Primary Examiner*—Hanh Nguyen (57) ABSTRACT

An apparatus, a method and a computer readable medium for generating media packets, the method includes the steps of: (a) providing packet boundary information representative of locations of potential packet boundaries within media objects; said packet boundary information facilitating generation of packets of varying sizes; (b) selecting packet boundaries in response to a packet size selection information; and (c) generating media packets in response to the selected packet boundaries.

27 Claims, 10 Drawing Sheets

APPARATUS, METHOD AND A COMPUTER READABLE MEDIUM FOR GENERATING MEDIA PACKETS

BACKGROUND OF THE INVENTION

MPEG4 File Format

QuickTime™ file format was developed by Apple™ Inc. and forms the basis of the Moving Picture Experts Group 4 (e.g. MPEG-4) standard, that was developed by the International Organization for Standardization. QuickTime™ file format provides an efficient tool for storing various kinds of audiovisual (e.g. media) data and for storing meta-data that describes the media data. QuickTime™ provides a hierarchical data structure that includes atoms. An atom may contain other atoms, and the latter atom can, in turn, contain other atoms. An atom that contains another atom is defined as a container atom. Each atom has an atom header that includes information such as the atom size and atom type information. Atom type information enables applications that process the atom to ignore atoms that they don't understand.

MPEG-4 presentations include a number of media elementary streams, such as video elementary streams and audio elementary streams. Each media elementary stream includes multiple access units (e.g.—samples). An access unit is a coded representation of a presentation unit. An audio access unit is the coded representation of an audio frame, while a video access unit includes the data required for presentation of a picture. A contiguous set of access units that belong to the same elementary stream is defined as a chunk. A chuck is organized as to enable optimized data access. Multiple media chunks form a media track. A movie may include more than a single track, whereas each track is independent of the other tracks.

Media data may be streamed over a network to a client but may also be downloaded to a client over a network, for local playback. MPEG-4 also defines hint tracks that include instructions for supporting streaming of media tracks over networks. Hint tracks include information that assist in packetizing the media track. It is noted that several hint tracks may be associated with a single media track, for allowing that media track to be streamed in various manners, such as by distinct communication protocols or at different packet sizes. The hint tracks suffer from various limitations that will be discusses further below.

Figure 1:
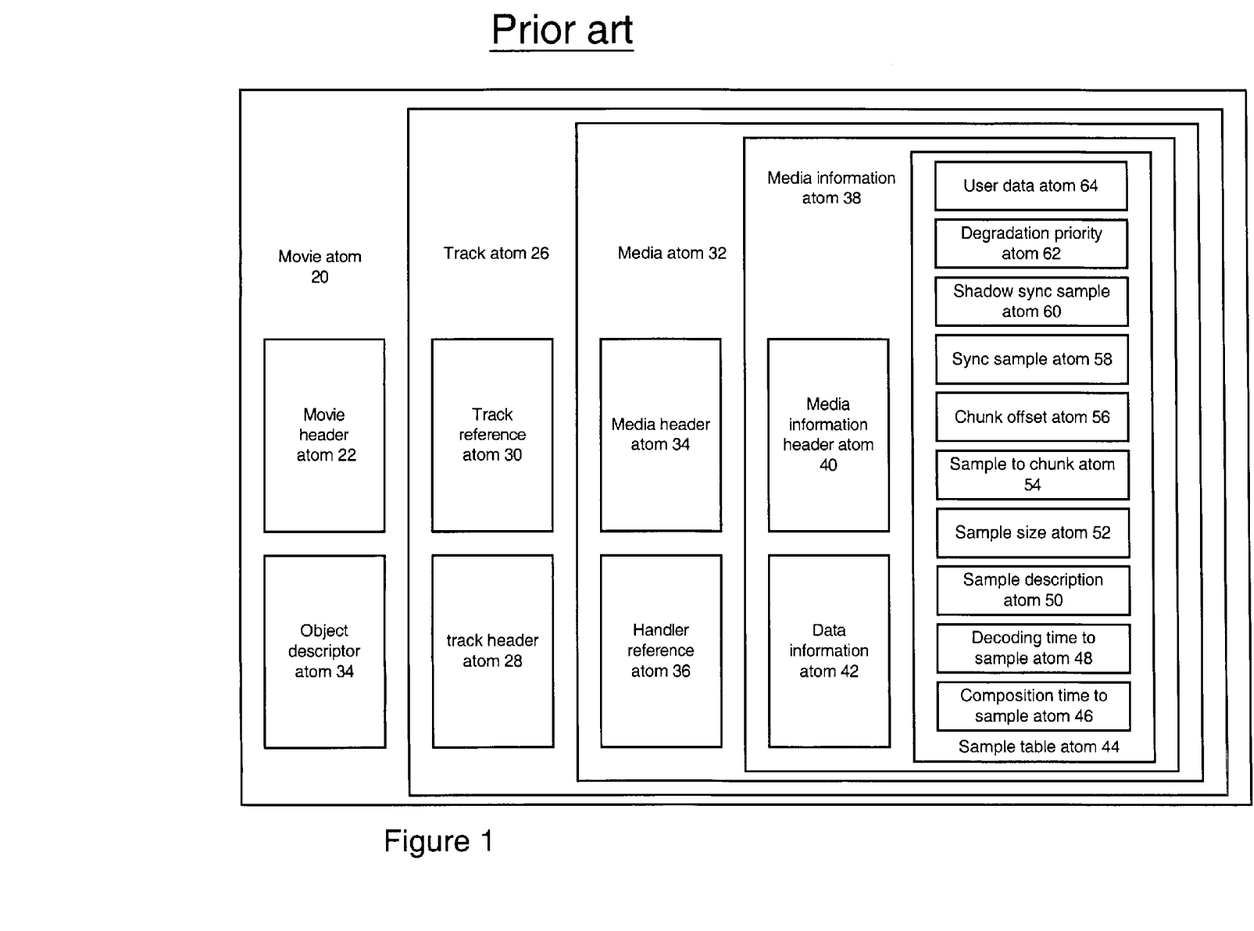
FIG. 1 illustrates a prior art movie atom.

The meta-data of a presentation is included within a movie atom. The movie atom may contain various media tracks of that presentation. An exemplary movie atom that contains a video track atom is illustrated in FIG. 1. Movie atom 20 is container atom to multiple atoms, such as movie header atom 22, object descriptor atom 24 and track atom 26. Track atom 26 is a container atom to track header atom 28, track reference atom 30 and media atom 32. Media atom 32 is a container atom to media header atom 34, handler reference atom 36 and media information atom 38. Media information atom 38 is a container atom for media information header atom 40, data information atom 42 and sample table atom 44. Sample table atom 44 is a container atom for composition time to sample atom 46, decoding time to sample atom 48, sample description atom 50, sample size atom 52, sample to chuck atom 54, chunk offset atom 56, sync sample atom 58, shadow sync sample atom 60 and degradation priority atom 62. Movie atom 32 or track atom 26 may be a container atom to a user data atom 64 that includes user specific information such as copyright notices. It is noted that movie atom 20 may include multiple track atoms, which in turn may include audio elementary streams as well as video elementary streams.

The MPEG-4 standard enables efficient storage and transmission of media information. The efficient storage and transmission is enabled by efficient compression schemes that include temporal as well as spatial compression.

Spatial compression usually includes transform coding, quantization and variable length encoding. Transform coding is operable to convert a group of picture pixels to a set of DCT (discrete cosine transform) coefficients, the DCT coefficients of a macro-block (representative of a predefined amount of picture pixels, such as 8×8 pixels) are quantized and are represented by pairs of amplitude/run-length, whereas the run-length value indicates the number of zeroes between two non-zero coefficients. The amplitude/run-length pairs of a macro-block are coded by a variable length coding scheme to provide compressed video streams.

Temporal compression is based upon the fact that there is usually little difference between consecutive video frames. A sequence of temporally compressed frames initiates by a self-contained key-frame (that is independent of preceding frames) that is followed by several Inter-frames, each Inter-Frame includes a difference between itself and at least another frame.

As a result of the compression schemes MPEG-4 access units have varying lengths.

A presentation may be provided to a client in a streaming mode or in a download mode. In a download mode the presentation is stored at the client memory and can be later fetched from the memory and processed to enable the display of that presentation. In streaming mode the client displays the streamed presentation.

In the streaming mode, there is a need to match between the bit rates of the streaming elementary streams, the available bandwidth for streaming these elementary streams over a communication network and the client processing capabilities. Mismatched may result in client over-flow (in which the client receive too much information and must throw away a part of the information) or in a client under-flow (in which the client does not receive enough information to enable a smooth display of the presentation). Furthermore, as various elementary streams are streamed to the client a bit-rate mismatch may result in loss of synchronization between ideally synchronized elementary streams.

Media Stream Packetizing

A hint track includes information that facilitates streaming a media track over a network. At the time the hint track is generated the packet size (of that associated media track) is determined. Accordingly, hint tracks do not enable dynamic changes of packet sizes. A hint track is associated with a certain packet size. If multiple packet sizes must be supported there is a need to generate (and store) multiple hint tracks, thus consuming both processing as well as memory resources.

SUMMARY OF THE INVENTION

The invention provides a method for generating media packets, the method including the steps of: (i) providing packet boundary information representative of locations of potential packet boundaries within media objects; said packet boundary information facilitating generation of packets of varying sizes; (ii) selecting packet boundaries in response to a packet size selection information; and (iii) generating media packets in response to the selected packet boundaries. The media objects may comply with a standard, such as but not limited to MPEG-4 standard.

The invention provides a computer readable medium having code embodied therein for causing an electronic device to perform the steps of: (i) providing packet boundary information representative of locations of potential packet boundaries within media objects; said packet boundary information facilitating generation of packets of varying sizes; (ii) selecting packet boundaries in response to a packet size selection information; and (iii) generating media packets in response to the selected packet boundaries.

The invention provides an apparatus for generating media packets including: (i) a storage unit for storing media objects, packet boundary information and packet size selection information; whereas the packet boundary information representative of locations of potential packet boundaries within media objects; and (ii) a packet generator, coupled to the storage unit, for fetching the packet boundary information, for selecting packet boundaries in response to the packet size selection information, and for generating media packets in response to the selected packet boundaries.

The apparatus may be connected to a transmitter that is operable to transmit the media packets over a communication media. The apparatus may be further be connected via a storage unit to a first and second processing unit for generating media presentations and the packet boundary information.

The packet size selection information may be responsive to bandwidth constraints of a communication media utilized for transferring the media packets, and the method may also include a step of updating packet selection information during a transmission of media objects.

According to an aspect of the invention the packet boundary information is contained within a hierarchical data structure that may include container atoms and may especially include user data atoms. The user data atoms may contain the packet boundary information.

According to an aspect of the invention the packet boundary information are access unit oriented. It may include either intra access unit offsets or differential intra access unit offsets.

BRIEF DESCRIPTION OF THE DRAWINGS

Further features and advantages of the invention will be apparent from the description below.

The invention is herein described, by way of example only, with reference to the accompanying drawings, wherein.

DETAILED DESCRIPTION OF THE INVENTION

In accordance with an aspect of the invention the invention may be compliant with various standards, such as but not limited to MPEG-4, 3GPP and the like.

Media packets usually do not start or end at arbitrary points within a media stream. The boundaries are identified by a predefined sequence of bits, such as "00000000000000001". Usually, multiple packet boundaries are included within a single access unit. A packetizer must either utilize a hint track that provides the location of these boundaries or may have to process the entire media stream to locate the boundaries. Processing the whole media stream is very inefficient, as these boundaries form an insignificant part of the entire media stream. As mentioned above, hint tracks may not be suited for supporting a wide range of packets sizes or for supporting dynamic changes in packet sizes.

A suit of communication protocols is utilized for the transmission of media packets over a network to a client. The suit of protocols enable to transmit media tracks over a variety of networks, from high speed and almost error-free networks to low speed error prone networks such as mobile networks. Some networks can detect when a fragment of a transmitted media track was lost during said transmission, while others are not able to detect (or at least are not able to detect in a timely manner) such a loss. In many cases the loss of a segment is detected only after a relatively long period, thus preventing to re-send the lost fragment. The packet boundaries enable to retransmit lost packets by monitoring the received packets and especially tracking after the boundaries of the received packets.

According to an aspect of the invention packet boundary information representative of locations of potential packet boundaries within the media track is provided. Conveniently, the packet boundary information is a part of meta-data that describes that media track, and preferably is a part of a user-defined atom. The user data atom may include additional user defined information, but this is not necessarily so. The User data atom may be contained in the movie atom, or be contained in a container atom that by itself is contained in another atom.

Figure 2A:
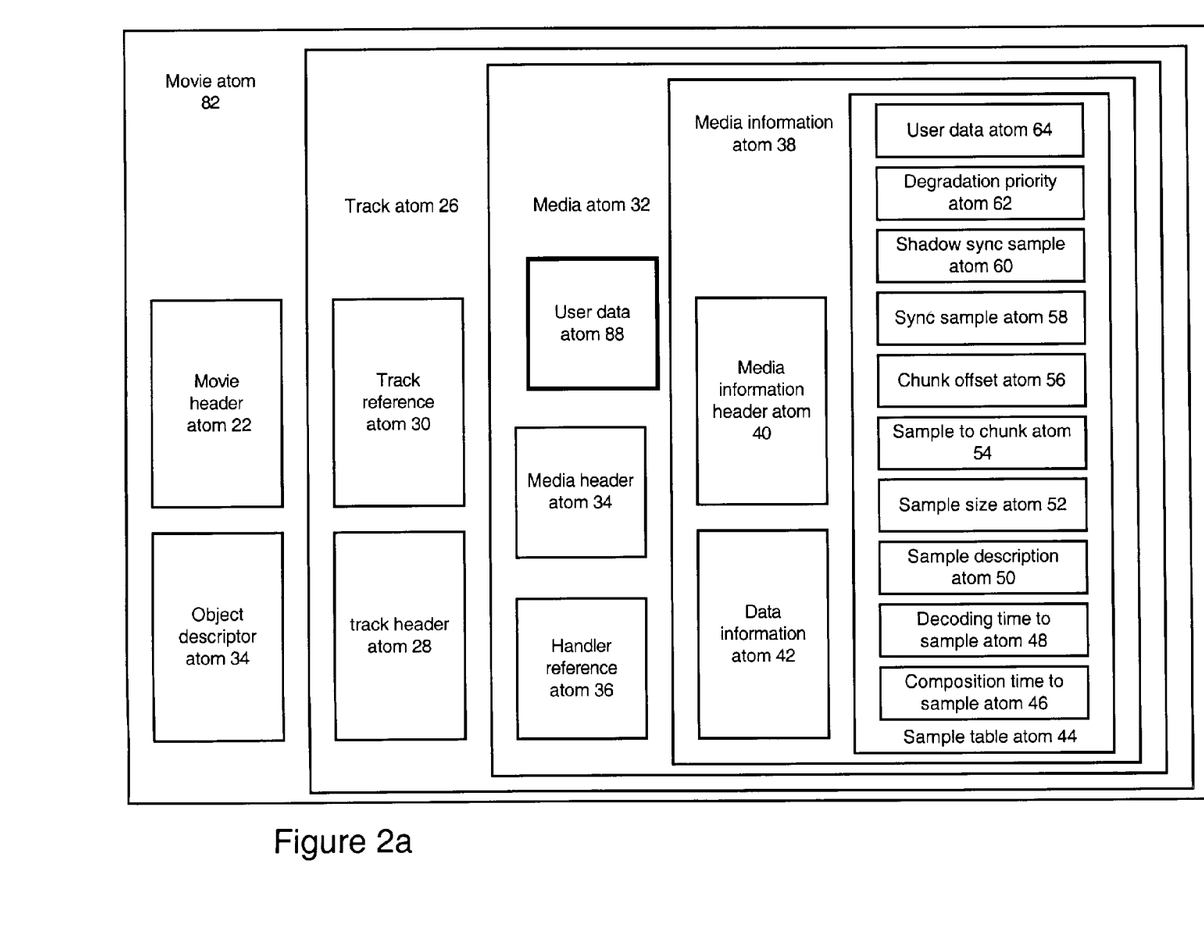
FIGS. 2a-2b illustrate various movie atoms, according to various embodiments of the invention.
Figure 2B:
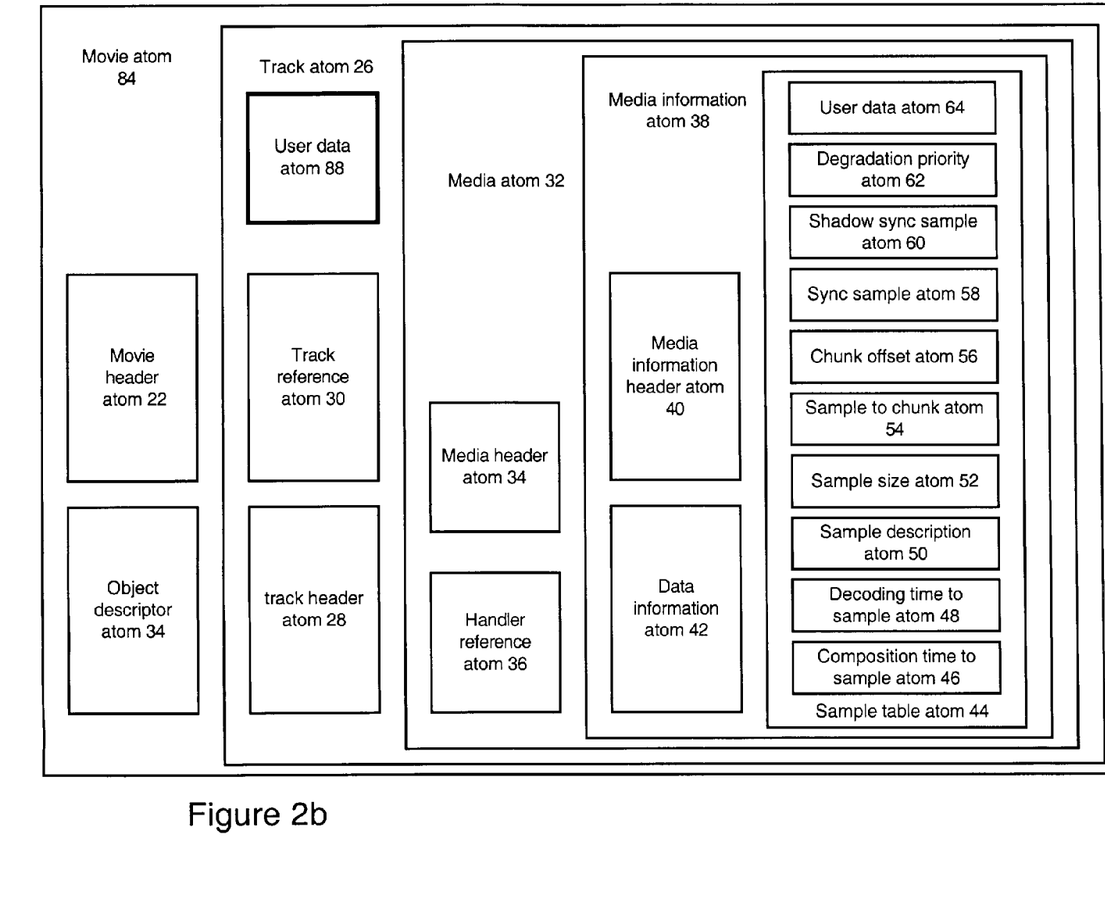

FIGS. 2a-2b illustrate various movie atoms 82 and 84 that differ from each other by the location of (e.g.—hierarchical level) of packet boundary information. According to an aspect of the invention at least part of the packet boundary information is contained within a user data atom 88, but this is not necessarily so. User data atom 88 may be contained within various container atoms, such as but not limited to media atom 32 (as illustrated by movie atom 82 of FIG. 2a) or track atom 26 (as illustrated by movie atom 84 of FIG. 2b). It is noted that the flexibility of the atom data structure enables to locate the user data atom within other atoms such as the movie atom.

According to an aspect of the invention, each access media includes multiple potential packet boundaries that may be located by packet boundary information. The locations of these potential packet boundaries may be defined by the offset from the beginning of the access unit (e.g.—"intra access unit offset"), or may be defined as the offset between adjacent potential packet boundaries ("differential intra access unit offset"). Usually, intra access unit offsets and especially differential intra access unit offsets are relatively small thus facilitating efficient storage of these offset.

Figure 3A:
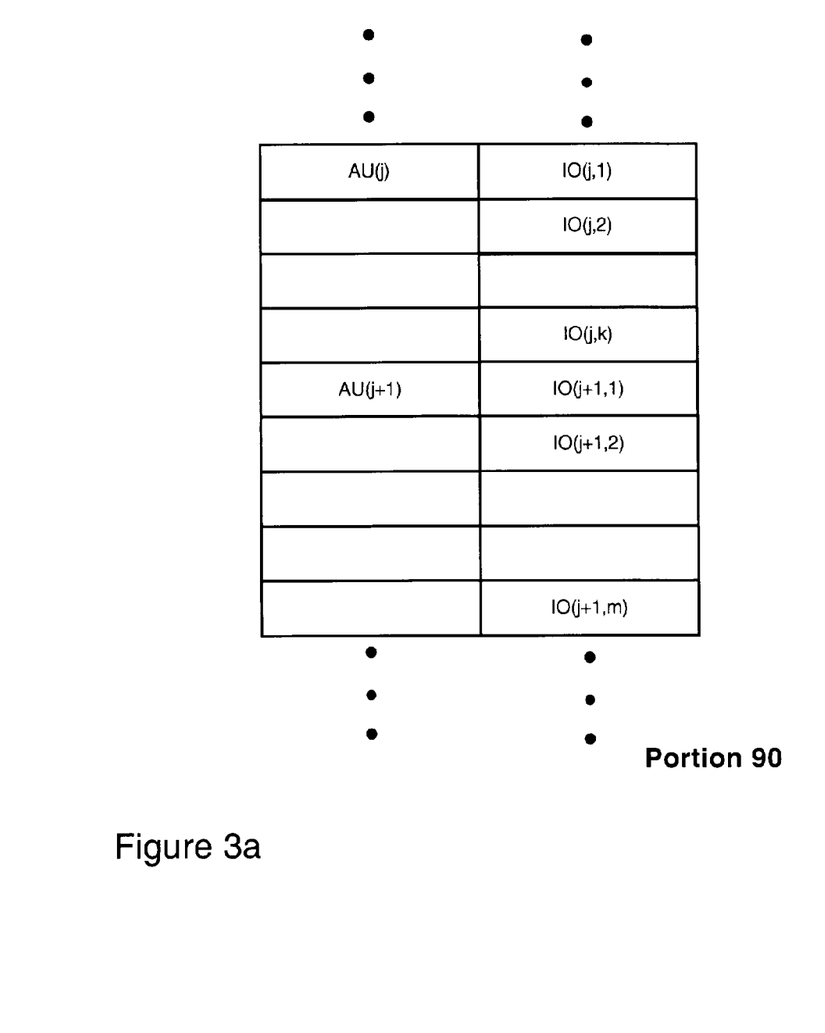
FIGS. 3a-3b illustrate portions of packet boundary information that contain intra access unit offsets and differential access unit offsets, in accordance to some embodiments of the invention.

FIGS. 3a and 3b illustrate portions of packet boundary information, according to two embodiments of the invention. Portion 90 of FIG. 3a includes two rows, the first indicating the access units of the media track which is associated with the sample atom table 44, while the second row includes intra access unit offsets. Usually, each access unit includes multiple intra access unit offsets, thus each access unit of the first row is associated with multiple second row values. For example, access units AU(j) and AU(j+1) are associated with multiple intra access unit offsets; such as IO(j,1) ... IO(j,k) and IO(j+1,1) ... IO(j+1,m).

Figure 3B:
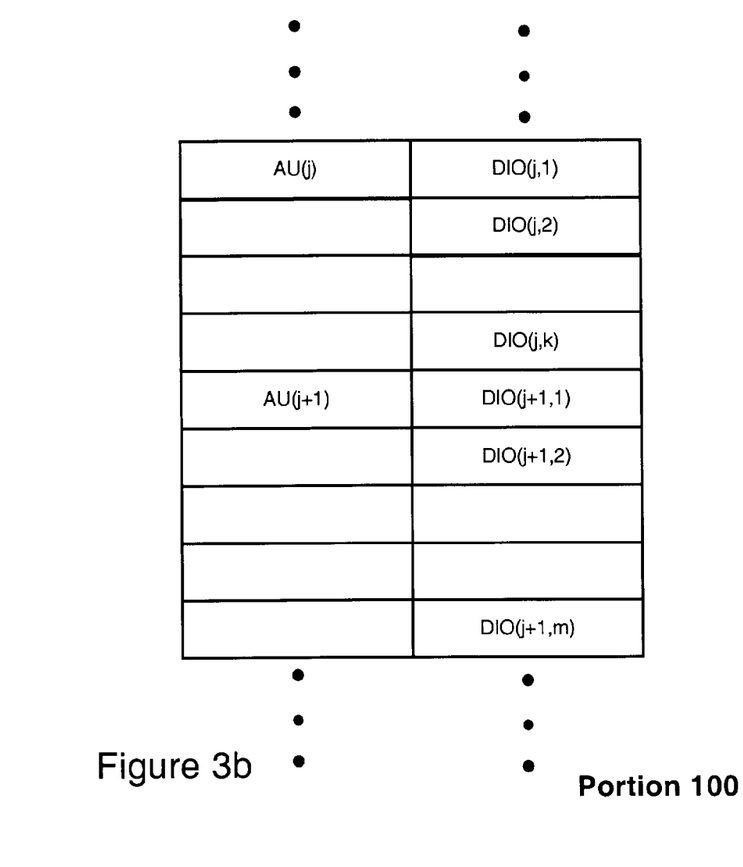

Portion 100 of FIG. 3b stores differential access unit offsets, instead of intra access unit offsets. For example, access units AU(j) and AU(j+1) are associated with multiple differential intra access unit offsets, such as DIO(j,1) ... DIO(j,k) and DIO(j+1,1) ... DIO(j+1,m), whereas DIO(j,1)=IO(j,1), DIO(j,k)=AI(j,k)−AI(j,k−1).

Figure 4A:
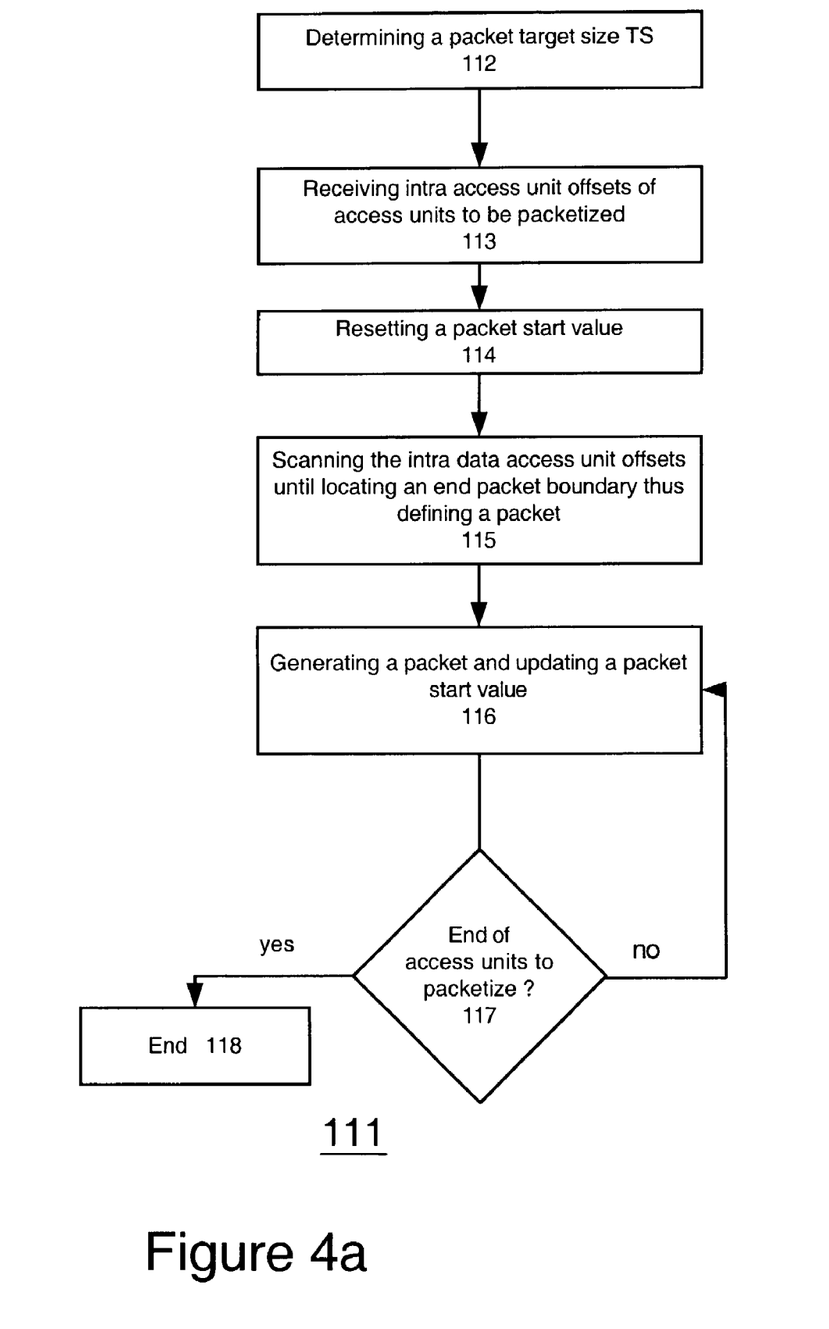
FIGS. 4a-4c illustrate methods for packetizing access units, according to embodiments of the invention.
Figure 4B:
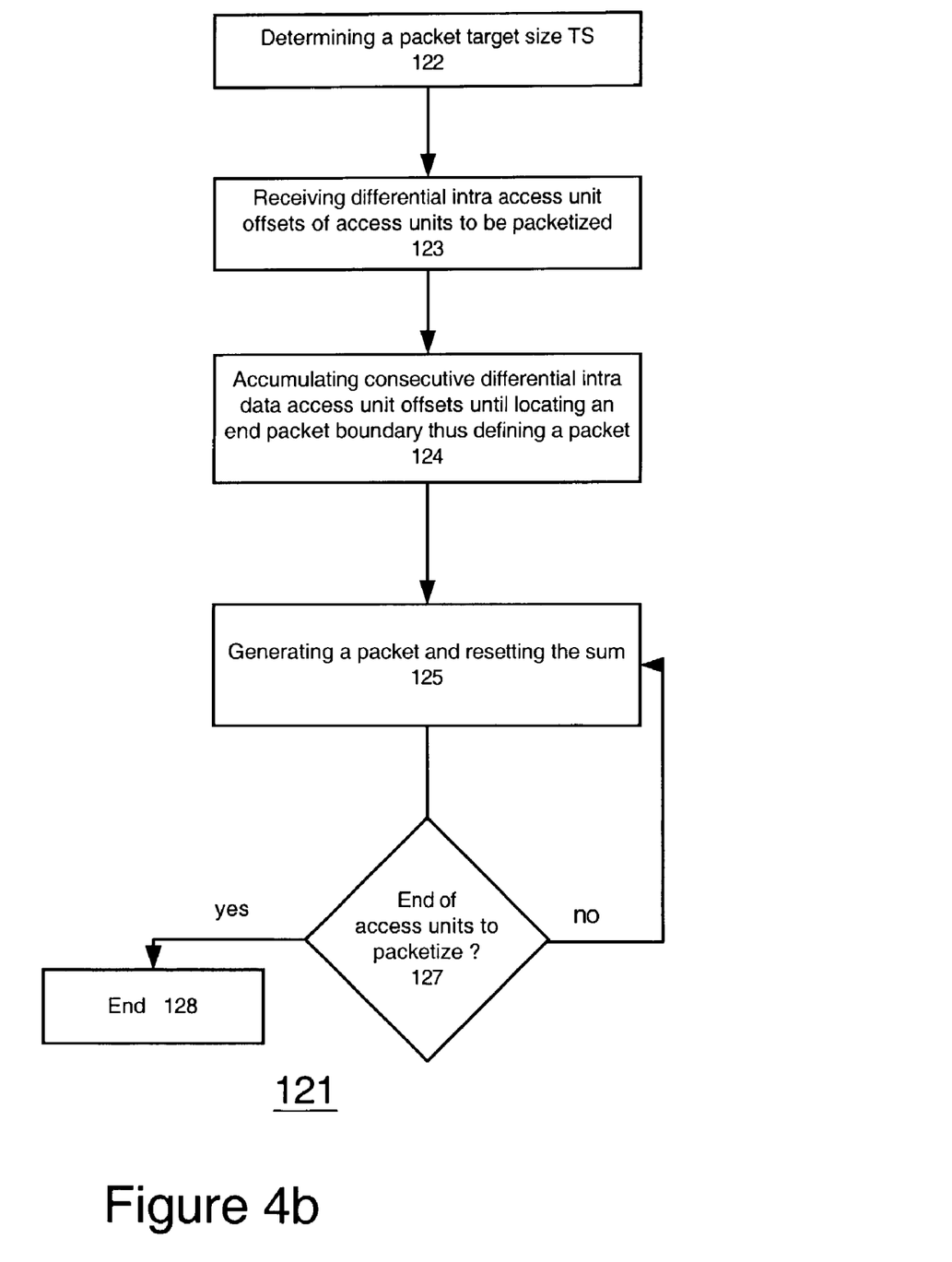
Figure 4C:
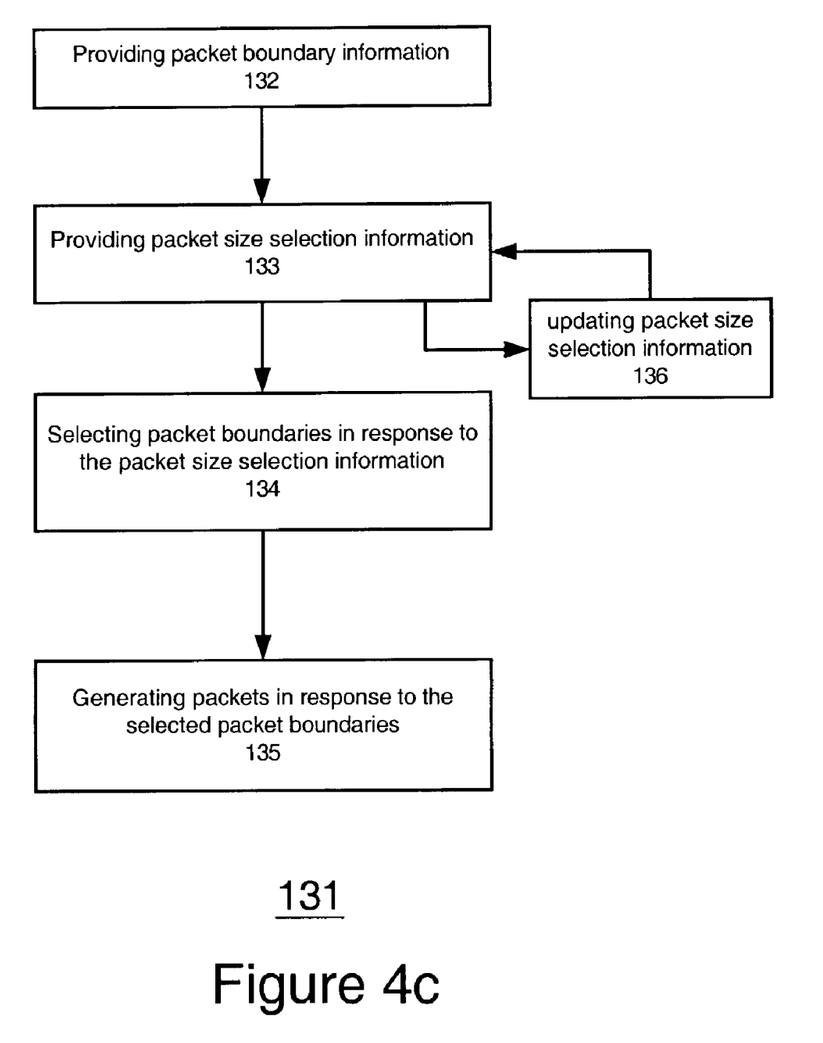

FIGS. 4a-4c illustrate methods 111, 121 and 131 for packetizing access units, according to embodiments of the invention.

Method 111 of FIG. 4a starts by step 112 of determining a packet target size TS. Step 112 is followed by step 113 of receiving intra access unit offset of access units to be packetized. Step 113 is followed by step 114 of resetting a packet start value. Step 114 is followed by step 115 of scanning the intra access unit offsets until locating an end packet boundary thus defining a packet. The offset between the end packet boundary and the packet start value is the largest offset that does not exceed the packet target size. Step 115 is followed by step 116 of generating a packet and updating the packet start value: packet start value=offset of the located packet boundary. Step 116 is followed by query step 117 to determine whether the packetizing is finished. If the packetization is not finished query step 117 is followed by step 116, else it is followed by "END" step 118.

Method 121 starts by step 122 of determining a packet target size TS. Step 122 is followed by step 123 of receiving differential intra access unit offset of access units to be packetized. Step 123 is followed by step 124 of accumulating consecutive differential intra access unit offsets until finding an end packet boundary thus defining a packet. The sum of the consecutive differential intra access units is the largest sum that does not exceed the packet target size. Step 124 is followed by step 125 of generating a packet and resetting the sum. Step 125 is followed by query step 127 to determine whether the packetizing is finished. If the packetizing is not finished query step 127 is followed by step 125, else it is followed by "END" step 128.

FIG. 4c illustrates method 131 for generating media packets, in accordance with an aspect of the invention. Method 131 starts by step 132 of providing packet boundary information representative of locations of potential packet boundaries within media objects, the packet boundary information facilitating generation of packets of varying sizes. The size of packets may vary even during a transmission of the media stream, as a result of various parameters such as but not limited to network available bandwidth, client processing and/or storage availability and the like. Step 132 is followed by step 133 of providing packet size selection information. The packet size selection information usually defined an upper limit to the packet size. Step 133 is followed by step 136 of updating the packet size selection information (for example, as a result of bandwidth measurement, as a result of client/network indications relating to their availability ). Step 133 is also followed by step 134 of selecting packet boundaries in response to a packet size selection information. Step 134 is followed by step 135 of generating media packets in response to the selected packet boundaries.

It is noted that steps 135, 134 and even 133 may form a loop that ends by a query step to determine whether the packet generation process is over.

Figure 5:
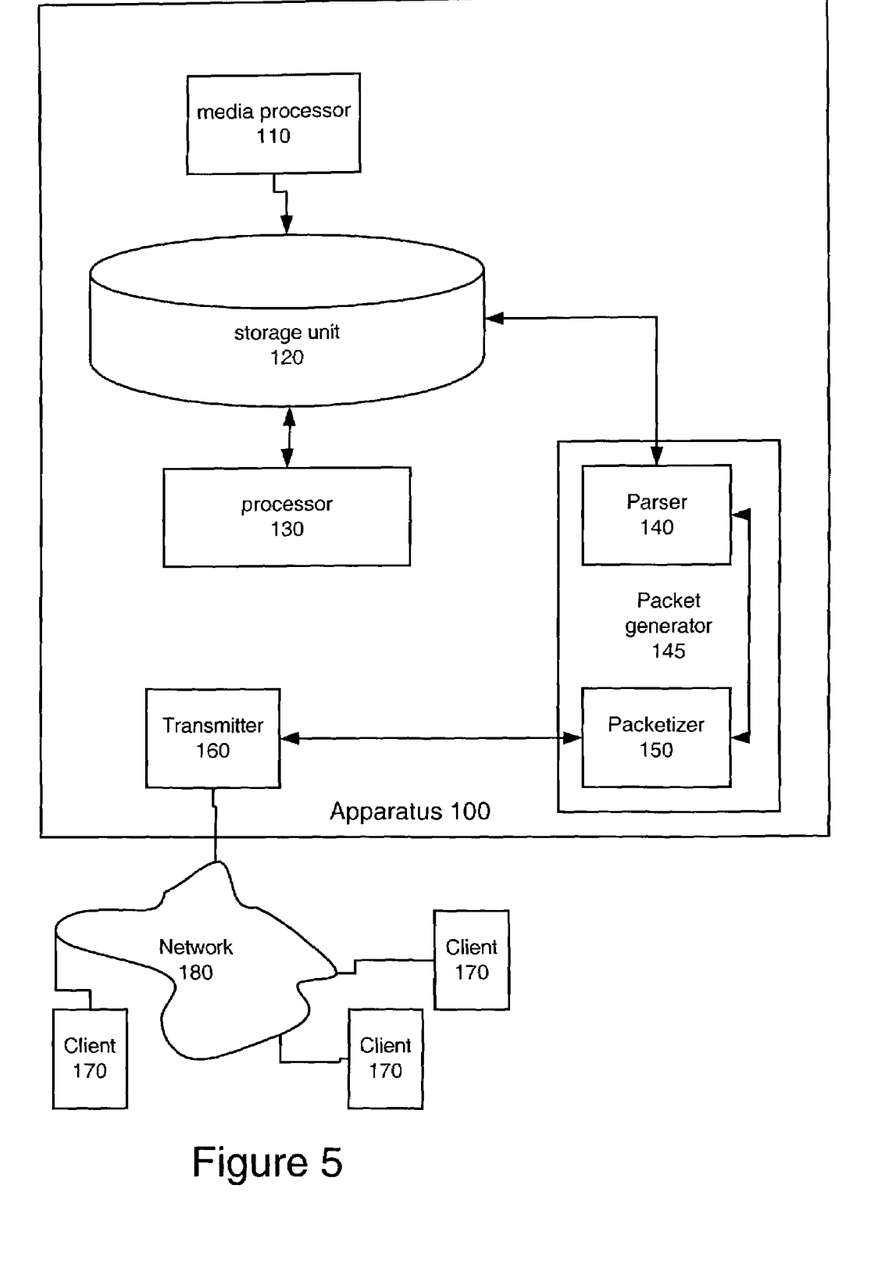
FIG. 5 illustrates an apparatus that is connected to multiple clients over a network, in accordance with an embodiment of the invention.

FIG. 5 illustrates an apparatus 100 connected to multiple clients 170 over a network 180, in accordance with an aspect of the invention.

Apparatus 100 includes first media processor 110, storage unit 120, second media processor 130, transmitter 160 and packet generator 145. Packet generator 145 preferably includes parser 140 and packetizer 150. Transmitter 160 is connected to multiple clients 170 over network 180. Packet generator 145 and transmitter may e included within a streaming server, such as streaming server 230 of FIG. 7.

First media processor 110 is operable to receive media data, such as raw video stream, raw audio stream and the like and to provide standard compliant media streams and meta-data, such as MPEG 4 compliant media atoms and meta-data atoms. First media processor 110 include an encoder that is able to encode media information, and may also be operable to insert potential packet boundaries.

First media processor 110 stores the MPEG-4 compliant media atoms and meta data atoms at storage unit 120. Second media processor 130 is able to fetch the media atoms and meta-data atoms and to insert random access information, and/or bit rate information and/or packet boundary information and the like. Second media processor 130 is able to insert user-defined atoms, random access atoms that include the mentioned above information.

According to an aspect of the invention, apparatus 100 is operable to store two versions of presentations—a download version that may be downloaded to a client for local playback, and a streaming version that may be streamed to a client. The streaming version may differ from the download version by an addition of the user data atom. The user data atom is not transmitted to the client but is a part of the streaming version. For example, apparatus 100 may store a first version of a presentation that is adapted for downloading, as well as storing a second version of the same presentation that is configured to facilitate streaming the media presentation to a client over a network. The download version may not include the user data atoms that include information required for packetizing the media stream, for various reasons such as but not limited to: (i) a client media player does not require the information, (ii) a client media player is not able to process the information, (iii) reduction of the amount of transmitted data, (iv) in order to conceal the user data atom information from the client.

Parser 140, packetizer 150 and transmitter 160 co-operate to fetch, packetize and transmit media packets over network 180 to clients 170. Parser 140 is operable to selectively fetch media atom portions and meta-data atoms from storage unit 120 and to provide packetizer 150 with fetched atoms. The meta-data atoms may include user data atoms that contain bit rate information: Packetizer 150 is operable to generate media packets and provide them to transmitter 160 to be transmitted over network 180. The transmitter 160 may be able to transmit the media atoms according to bit rate information provided by parser 140. Transmitter 160 may be further operable to analyze the transmission of packets and especially to determine available bandwidth, generate available bandwidth statistics, determine amount of lost packets, and the like.

Figure 6:
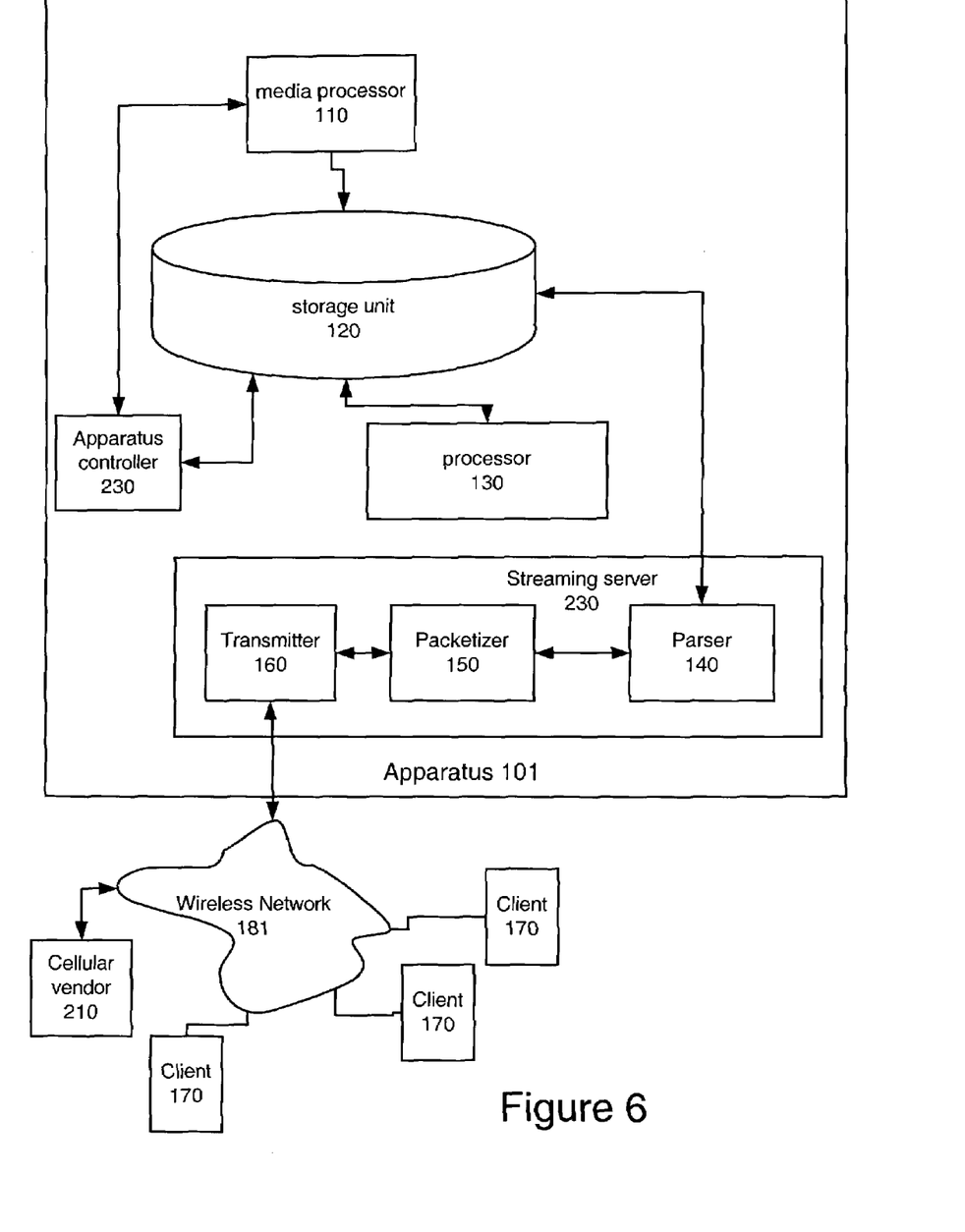
FIG. 6 illustrates an apparatus and its environment, in accordance with an embodiment of an invention.

FIG. 6 illustrates an apparatus 101 and its environment, in accordance with an embodiment of an invention.

The environment includes a cellular network vendor 210 that is connected over wireless network 181 to clients 170. Apparatus 101 includes controller 220 is operable to manage the storage of media streams and the retrieval of media presentations stored within storage unit 120. Apparatus controller 220 is connected to first media processor 110 and media storage unit 120 in order to manage the storage of a download version of a media presentation and a streaming version of the media presentation. Conveniently, apparatus controller 220 maintains a list of download pointers to download versions of media presentations and a list of streaming pointers to streaming versions of media presentations. Apparatus controller 220 assigns an identification number (ID) to each of such versions, and is operable to supply cellular network vendor 210 with these IDs.

When a client 170 requests to receive a certain streaming media presentation, he forwards a request to the cellular network vendor 210 that returns an ID that was assigned to the streaming version of the requested media presentation. Client 170 then accesses streaming server 230 with said ID. Streaming server 230 accesses apparatus controller 220 with the requested ID and in response is provided with a pointer to the streaming version of the required media presentation within storage unit 120. Streaming server 230 is operable to sequentially access consecutive access units of that media presentation and to stream them to client 170. If the client issues a play from offset request, streaming server 230 accesses the random access unit and provides the required access unit in an efficient manner.

Streaming server 230 is also operable to packetize media streams in response to packet boundary information and packet size selection information, and also to alter the packet size selection information in response to available bandwidth statistics, client characteristics and the like. In some cases the size of a packet is determined by the communication protocol. For example ATM frames include 53 bytes each. In such a case the packet size cannot be updated in accordance to the available bandwidth. On the other hand IP communication protocol may enable packets of varying sizes, thus larger packet sized may generated if there is more available bandwidth and especially if the rate of lost packets is quite low. Client characteristics may be predefined by the cellular network vendor 210, by the client itself or by another entity within apparatus 100 or environment 200. The characteristics may be responsive to client communication interface capabilities, client processing capabilities, communication network or other media bandwidth constraints and the like. The characteristics may also be defined in response to a analysis of previous media packet transmission to the client.

Those skilled in the art will readily appreciate that various modifications and changes may be applied to the preferred embodiments of the invention as hereinbefore exemplified without departing from its scope as defined in and by the appended claims.

I claim:

1. A method for generating media packets, the method comprising the steps of:
   providing at a storage unit packet boundary information representative of locations of potential packet boundaries within media objects; said packet boundary information facilitating generation of packets of varying sizes; wherein said packet boundary information comprises intra access unit offsets;
   selecting at a packet generator packet boundaries in response to a packet size selection information; and generating media packets in response to the selected packet boundaries.

2. The method of claim 1 wherein the packet size selection information is responsive to bandwidth constraints of a communication media utilized for transferring the media packets.

3. The method of claim 1 further comprising a step of updating packet selection information during a transmission of media objects.

4. The method of claim 1 wherein the step of providing packet boundary information comprises retrieving packet boundary information from a hierarchical data structure.

5. The method of claim 4 wherein the hierarchical data structure comprises container atoms.

6. The method of claim 4 wherein the packet boundary information is included within a user data atom.

7. The method of claim 1 wherein the step of selecting packet boundaries comprises the steps of:
   determining a packet target size;
   determining a packet start value;
   locating an access unit such that a difference between an intra access unit offset associated with the located access unit and the packet start value (i) does not exceed the packet target size, and (ii) is closets to the packet target size; and
   defining a starting point of the access unit that is associated with the packet start value as a start packet boundary and defining a starting point of an access unit that preceded the located access unit as an end packet boundary.

8. The method of claim 7 whereas the step of selecting packet boundaries is followed by a step of selecting a starting point of the located access unit as a packet start value.

9. The method of claim 1 wherein the packet boundary information comprises differential intra access unit offsets.

10. The method of claim 9 wherein the step of selecting packet boundaries comprises the steps of:
    determining a packet target size;
    determining a packet start value;
    locating an access unit such that a sum of consecutive differential intra access unit offset starting from the packet start value and ending at the located access unit (i) does not exceed the packet target size, and (ii) is closets to the packet target size; and
    defining a starting point of the access unit that is associated with the packet start value as a start packet boundary and defining a starting point of an access unit that preceded the located access unit as an end packet boundary.

11. The method of claim 10 whereas the step of selecting packet boundaries is followed by a step of selecting a starting point of the located access unit as a packet start value.

12. The method of claim 1 wherein the media objects are MPEG-4 compliant.

13. The method of claim 1 wherein the media objects are 3GPP compliant.

14. An apparatus for generating media packets comprising:
    a storage unit for storing media objects, packet boundary information and packet size selection information; whereas the packet boundary information representative of locations of potential packet boundaries within media objects; wherein the packet boundary information comprises intra access unit offsets;
    a packet generator, coupled to the storage unit, for fetching the packet boundary information, for selecting packet boundaries in response to the packet size selection information, and for generating media packets in response to the selected packet boundaries.

15. The apparatus of claim 14 coupled to a transmitter that is operable to transmit the media packets over a communication media.

16. The apparatus of claim 15 wherein the apparatus is configured to adapt the packet size selection information in response to bandwidth constraints of the communication media.

17. The apparatus of claim 15 wherein the packet generator is further adapted to update packet selection information during a transmission of media objects.

18. The apparatus of claim 14 wherein the storage unit stores a hierarchical data structure that contains the packet boundary information.

19. The apparatus of claim 18 wherein the hierarchical data structure comprises at least one container atoms.

20. The apparatus of claim 19 wherein the packet boundary information is included within a user data atom.

21. The apparatus of claim 20 wherein the packet boundary information comprises differential intra access unit offsets.

22. The apparatus of claim 21 wherein the packet generator is operable to:
   determine a packet target size;
   determine a packet start value;
   locate an access unit such that a sum of consecutive differential intra access unit offset starting from the packet start value and ending at the located access unit (i) does not exceed the packet target size, and (ii) is closets to the packet target size; and
   define a starting point of the access unit that is associated with the packet start value as a start packet boundary and define a starting point of an access unit that preceded the located access unit as an end packet boundary.

23. The apparatus of claim 22 whereas the packet generator is further operable to select packet boundaries and then select a starting point of the located access unit as a packet start value.

24. The apparatus of claim 14 wherein the packet generator is operable to:
   determine a packet target size;
   determine a packet start value;
   locate an access unit such that a difference between an intra access unit offset associated with the located access unit and the packet start value (i) does not exceed the packet target size, and (ii) is closets to the packet target size; and
   define a starting point of the access unit that is associated with the packet start value as a start packet boundary and define a starting point of an access unit that preceded the located access unit as an end packet boundary.

25. The apparatus of claim 24 whereas the packet generator is operable to select packet boundaries and then select a starting point of the located access unit as a packet start value.

26. The apparatus of claim 14 wherein the media objects are MPEG-4 compliant.

27. The apparatus of claim 14 wherein the media objects are 3GPP compliant.

* * * * *